United States Patent
Boileau et al.

(12) 
(10) Patent No.: US 6,271,280 B1
(45) Date of Patent: Aug. 7, 2001

(54) DIACETYLENIC POLYORGANOSILOXANES, INTERMEDIATES THEREFOR, AND CURED COMPOSITIONS PREPARED THEREFROM

(75) Inventors: Sylvie Louise Boileau, Paris (FR); Anna Elzbieta Kowalewska, Domaniewice (PL); Laurent Bouteiller, Reine (FR); Matthew David Butts, Rexford; Slawomir Rubinsztajn, Niskayuna, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/552,574

(22) Filed: Apr. 19, 2000

(51) Int. Cl.$^7$ ..................................................... C08F 38/00
(52) U.S. Cl. ............................ 522/99; 526/285; 526/279; 568/673; 556/445; 556/479; 528/31; 528/25; 528/29; 528/12; 528/15; 570/189; 525/479
(58) Field of Search ..................................... 526/285, 279; 568/673; 556/445, 479; 528/31, 25, 29, 12, 15; 570/189; 525/479; 522/99; 427/387, 515

(56) References Cited

U.S. PATENT DOCUMENTS 5,329,036 * 7/1994 Dougherty et al. .

FOREIGN PATENT DOCUMENTS

| 4302993 | 4/1994 | (DE) . |
| 4303080 | 11/1994 | (DE) . |
| 0210056 | 1/1987 | (EP) . |
| 235727 | 10/1996 | (FR) . |
| 235728 | 10/1996 | (FR) . |
| 10120689 | * 5/1998 | (JP) . |

OTHER PUBLICATIONS

"Synthesis and Characterization of Linear Siloxane–Diacetylene Polymers", David Y. Son and Teddy M. Kelleer, Macromolecules (1995), 28, pp. 399–400.

"Oxidative Coupling as a Potential Route to Polymers of Group IV Acetylenes", D.R. Parnell and Domenic P. Macaione, Journal of Polymer Science, vol. 11, pp. 1107–1110 (1973).

"Mesomorphic Properties of Copolymers Containing Diacetylenic and Siloxane Units in the Flexible Spacers", X. Lai, Y. Ozcayir and A. Blumstein, Mol. Cryst. Liq. Cryst., vol. 188, (1990) pp. 25–39.

Synthesis of Liquid Crystalline Polysiloxanes and Polymethacrylates Containing Diphenyldiacetylene Side Groups, C.S. Hsu, Y.H. Lu and Y.N. Chen—Dept. of Applied Chemistry, National Chiao Tung University Hsinchu, Taiwan, pp. 214–215.

* cited by examiner

Primary Examiner—Robert Dawson
Assistant Examiner—Kuo-Liang Peng
(74) Attorney, Agent, or Firm—Bernadette M. Bennett; Noreen C. Johnson

(57) ABSTRACT

Intermediate compositions comprising ethynylorgano polyorganosiloxanes are prepared by hydrosilylation of an olefinic hydroxy compound followed by reaction with a propargyl halide, or by hydrosilylation of a diethynyl compound. The intermediate compositions may be oxidatively coupled to form poly(conjugated diacetylenic)polyorganosiloxanes. The latter may be cured thermally or by radiation to form cured compositions useful as release coatings or conformal coatings.

29 Claims, No Drawings

DIACETYLENIC POLYORGANOSILOXANES, INTERMEDIATES THEREFOR, AND CURED COMPOSITIONS PREPARED THEREFROM

BACKGROUND OF THE INVENTION

This invention relates to acetylenic polyorganosiloxane compounds. More particularly, it relates to a class of diacetylenic polyorganosiloxanes and their curing.

Polyorganosiloxanes (hereinafter sometimes designated "silicones") having acetylenic moieties are known in the art, being disclosed in a number of publications. For example, compounds having conjugated diacetylenic groups bound directly to silicon atoms are disclosed in Son et al., *Macromolecules*, 28, 399–400 (1995), and in Parnell et al., *J. Poly. Sci., Poly. Chem. Ed.*, 11, 1107–1110 (1973). Genera of compounds in which similar diacetylenic groups are present in combination with amide or ester groups and silicone moieties are among the subjects of European patent application 210,056 and Lai et al., *Mol. Cryst. Liq. Cryst.*, 188, 25–39 (1990). Silicones having pendant phenyldiethynylphenyloxyalkyl groups are disclosed in Hsu et al., *Poly. Prep.*, 33, 214–215 (1992). Diacetylenic silicones containing a Si—O—C linkage are disclosed in German published applications 4,302,993 and 4,303,080.

Such materials have potential for being cured, as by heat or radiation, to produce materials useful, for example, as release coatings or conformal coatings. However, they suffer from various disadvantages including high cost of preparation and chemical instability, the latter being particularly true of compounds having a Si—O—C linkage.

French patent applications 96/11,999 and 96/12,000 disclose polymeric compositions containing ether groups in combination with diacetylenic moieties. However, no silicone moieties are present.

It remains of interest, therefore, to develop diacetylenic silicone compounds which are relatively inexpensive, stable and easily cured.

SUMMARY OF THE INVENTION

The present invention provides a series of chemically stable diacetylenic silicones and a series of acetylenic silicone intermediates therefor, said intermediates being readily converted to the diacetylenic compounds by a coupling reaction. Also provided are cured compositions prepared from said diacetylenic silicones, as well as a method of curing the same which employs ultraviolet radiation but does not require the presence of promoters, sensitizers or other additives.

In the formulas herein, a conventional nomenclature for polyorganosiloxanes is employed. It utilizes the symbols M, D, T and Q for radicals of the general type $R_3SiO_{1/2}$, $R_2SiO_{2/2}$, $RSiO_{3/2}$ and $SiO_{4/2}$ as abbreviations for "mono", "di", "tri" and "quaternary", respectively, to represent the number of Si—O moieties in which the oxygen atom is linked to another silicon atom, the fractional subscripts designating oxygen atoms bound to two silicon atoms each. Thus, as used herein the symbols D and T do not have their common meanings of deuterium and tritium, respectively.

In one of its aspects, then, the present invention includes intermediate compositions comprising ethynylorgano polyorganosiloxanes having the formula $$(M^1)_a(M^2)_b(D^1)_c(D^2)_d(T^1)_e(T^2)_fQ_g, \quad (I)$$

wherein:

$M^1$ is $(R^2)_3SiO_{1/2}$, $D^1$ is $(R^2)_2SiO_{2/2}$, $T^1$ is $R^2SiO_{3/2}$,

Q is $SiO_{4/2}$, $M^2$ is

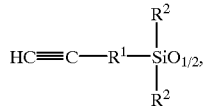

$D^2$ is

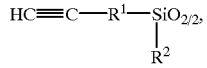

$T^2$ is

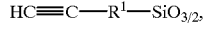

each of "a", "b", "c", "d", "e", "f" and "g" is 0 or greater, with the proviso that "b"+"d"+"f" is at least 1;

each $R^1$ is independently a divalent organic radical having no Si—O—C moieties and containing at least one oxygen atom not directly bound to Si or at least one CH═CH moiety directly bound to Si; and each $R^2$ is independently an alkyl radical, alkoxy radical, alkenyl radical, aryl radical, aryloxy radical, alkyl-substituted aryl radical, and aralkyl radical which groups may be halogenated.

Another aspect of the present invention includes compositions comprising poly(conjugated diacetylenic) polyorganosiloxanes formed by coupling of the above-described ethynylorgano polyorganosiloxanes.

A further aspect of the present invention is a method for producing a cured polyorganosiloxane which comprises exposing said poly(conjugated diacetylenic) polyorganosiloxane compositions to heat or radiation. A still further aspect is cured polyorganosiloxanes so prepared.

DETAILED DESCRIPTION

In the ethynylorgano silicones of formula I, the "a"–"g" subscripts are each 0 or greater with the proviso that "b"+"d"+"f" is at least 1. Preferably, "c" is in a range between about 1 and about 500 and "e", "f" and "g" are each 0; i.e., the preferred silicones are triorganosiloxy-terminated polyorganosiloxanes. More preferably, "c" is in a range between about 5 and about 50; most preferably, in a range between about 5 and about 25.

The sum "b"+"d"+"f", i.e., the total number of ethynyl groups per molecule, is at least 1, i.e. mono, preferably at least 2, and more preferably 2. In the most preferred ethynylorgano silicones, "b" is 2 and "d" and "f" are each 0; i.e., the preferred compounds are ethynyl-terminated polyorganosiloxanes.

A particularly preferred class of ethynyl-terminated silicones consists of those having the formula (II)

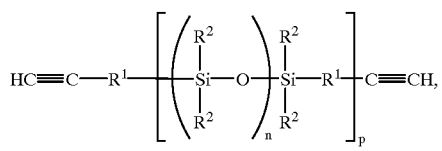

wherein "n" is in a range between about 1 and about 500, preferably in a range between about 5 and about 50 and most preferably in a range between about 5 and about 25; "p" is in a range between about 1 and about 100, preferably in a range between about 1 and about 10, and most preferably 1 or 2; $R^1$ is as previously defined; and $R^2$ is independently at each occurrence a $C_{1-22}$ alkyl, $C_{1-22}$ alkoxy, $C_{2-22}$ alkenyl, $C_{6-20}$ aryl, $C_{6-20}$ aryloxy, $C_{6-22}$ alkyl-substituted aryl, and $C_{6-22}$ aralkyl groups may be halogenated, for example, flourinated to contain fluorocarbons such as $C_{1-22}$ fluoroalkyl; Z, independently at each occurrence, represents the molecular hook; and X, independently at each occurrence, represents the linker. The term "alkyl" as used in various embodiments of the present invention is intended to designate both normal alkyl, branched alkyl, aralkyl, and cycloalkyl radicals. Normal and branched alkyl radicals are preferably those containing from 1 to about 12 carbon atoms, and include as illustrative non-limiting examples methyl, ethyl, propyl, isopropyl, butyl, tertiary-butyl, pentyl, neopentyl, and hexyl. Cycloalkyl radicals represented are preferably those containing from 4 to about 12 ring carbon atoms. Some illustrative non-limiting examples of these cycloalkyl radicals include cyclobutyl, cyclopentyl, cyclohexyl, methylcyclohexyl, and cycloheptyl. Preferred aralkyl radicals are those containing from 7 to about 14 carbon atoms; these include, but are not limited to, benzyl, phenylbutyl, phenylpropyl, and phenylethyl. Aryl radicals used in the various embodiments of the present invention are preferably those containing from 6 to 14 ring carbon atoms. Some illustrative non-limiting examples of these aryl radicals include phenyl, biphenyl, and naphthyl. An illustrative non-limiting example of a halogenated moiety suitable for $R^2$ groups is trifluoropropyl. Most often, all $R^2$ radicals are methyl.

The $R^1$ radicals in formulas I and II are divalent radicals which contain no Si—O—C moieties, which detract from stability. In one preferred embodiment of the invention, said $R^1$ radicals contain at least one oxygen atom not directly bound to Si. Such $R^1$ radicals most often have the formula III or IV (III)

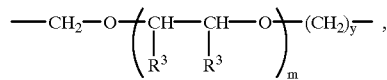

wherein each $R^3$ is independently hydrogen or $C_{1-4}$ alkyl, "m" is in a range between about 0 and about 100, "y" is in a range between about 3 and about 10 and $(CH_2)_y$ is bonded to silicon. Most often, each $R^3$ is hydrogen, "m" is 1 and "y" is 3.

Formula (IV)

(IV)

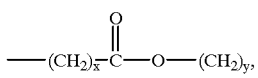

wherein "y" is defined above, $(CH_2)_y$ is bonded to silicon, "x" is in a range between about 1 and about 100, preferably in a range between about 1 and about 50 and most preferably, in a range between about 1 and about 10.

In another preferred embodiment, $R^1$ contains at least one olefinic moiety directly bound to Si, and more preferably, only one olefinic moiety directly bound to Si. Radicals of this type include those of the formulas

 (V)

and

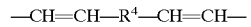 (VI)

wherein $R^4$ is a divalent organic radical, which may be an aliphatic, aromatic or mixed aliphatic-aromatic hydrocarbon radical or may contain hetero atoms, and the olefinic carbon atoms are bound to Si. Preferably, $R^4$ is an alkylene or divalent aromatic hydrocarbon or aromatic ether radical. The alkylene radicals employed as $R^4$ most often contain in a range between about 2 and about 10 carbon atoms, with 4 carbon atoms (i.e., tetramethylene) frequently being preferred. The preferred aromatic radicals include p-phenylene and a radical of the formula (VII)

In the radicals of formulas I and II, $R^2$ is defined as above.

One subgenus of intermediate ethynyl-terminated silicones of formula II may be prepared by a 2-step reaction sequence in which the first step is hydrosilylation of a hydride-containing silicone with an olefinic hydroxy compound of the formula

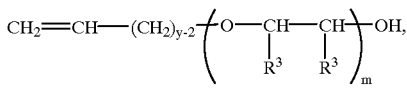

wherein $R^3$, "m" and "y" are as previously defined. At least one olefinic hydroxy compound having this structure, 2-(2-propenyloxy)ethanol(ethylene glycol allyl ether), is commercially available.

The polyorganosiloxanes of the present invention are typically prepared by the hydrosilylation of an hydride-containing silicone having the formula:

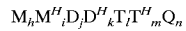

where the subscripts h, j, k, l, m and n are zero or a positive integer, subject to the limitation that the sum of the subscripts i, k and m is one or greater; where M has the formula:

$M^H$ has the formula:

$$R^2{}_{3-o}H_oSiO_{1/2},$$

D has the formula:

$$R^2{}_2SiO_{2/2},$$

$D^H$ has the formula:

$$H_{2-p}R^2{}_pSiO_{2/2},$$

T has the formula:

$$R^2SiO_{3/2},$$

$T^H$ has the formula:

$$HSiO_{3/2},$$

and Q has the formula $SiO_{4/2}$, wherein "o" is in a range between about 1 and about 3, and preferably, 1, "p" is 0 or 1 and preferably, 1, wherein each $R^2$ is independently at each occurrence as defined above.

The hydride-containing silicone compounds that are the precursors to the compounds of the present invention may be prepared by the process disclosed in U.S. Pat. No. 5,698,654 herewith. The '654 patent discloses a sequential catalysis of the ring opening polymerization of cyclic organosiloxanes using a base catalyst that can be neutralized by a subsequent redistribution and condensation catalyst such as a Lewis acid catalyst, preferably a phosphonitrilic compound, that permits the rapid synthesis of functionalized and poly-functionalized silicone copolymers.

It is to be noted that as pure compounds the subscripts describing the hydride-containing silicone precursor and the hydrosilylation adduct of the present invention are integers as required by the various rules of chemical stoichiometry. As mixtures of compounds that are described by these formulas the subscripts will assume non-integral values, for the mixtures. The restrictions on the subscripts heretofore described for the stoichiometric subscripts of these compounds are for the pure compounds, not the mixtures.

Conventional hydrosilylation conditions may be employed for this reaction. These include temperatures in a range between about 0° C. and about 150° C., the optional presence of a relatively non-polar solvent such as toluene, stoichiometric or near-stoichiometric proportions of reagents and the use of a hydrosilylation catalyst, most often in an amount in a range between about 1 ppm and about 500 ppm by weight. The catalyst is usually a compound of a platinum group metal; i.e., ruthenium, rhodium, palladium, osmium, iridium or platinum. Examples of suitable hydrosilylation catalysts are disclosed in U.S. Pat. Nos. 3,159,601, 3,159,662, 3,220,970, 3,516,946, 3,775,452 and 4,029,629.

The preferred hydrosilylation catalysts are platinum compounds. A reaction product of chloroplatinic acid with tetramethyldivinyldisiloxane in the presence of sodium bicarbonate as disclosed in the aforementioned U.S. Pat. No. 3,775,452, diluted to a level of about 5% by weight platinum by addition of a solvent such as toluene or xylene, is often preferred; it is hereinafter designated "Karstedt's catalyst". Another suitable platinum-containing catalyst is a platinum-octanol complex containing about 90.9% octanol and about 9.1% chloroplatinic acid by weight.

The hydrosilylation reaction produces a dihydroxy compound of the formula

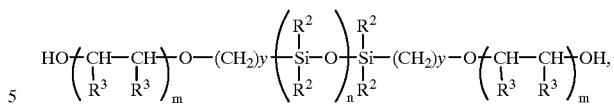

wherein $R^2$, $R^3$, "m", "n", and "y" are as previously defined. In the second step, said dihydroxy compound undergoes reaction with a propargyl halide such as propargyl bromide, typically under alkaline conditions and in the presence of a phase transfer catalyst such as a quaternary ammonium, quaternary phosphonium or hexaalkylguanidinium salt or a crown ether. A reaction temperature in a range between about 0° C. and about 50° C. is most often employed.

Another subgenus of intermediate ethynyl-terminated silicones of formula II, in which "p" typically varies in a range between about 1 and about 10, may be prepared by the hydrosilylation reaction between a hydride-terminated silicone and a diethynyl compound of the formula $$HC{\equiv}C{-}R^4{-}C{\equiv}CH,$$

wherein $R^4$ is as previously defined. Suitable diethynyl compounds include 1,7-octadiyne and the compounds p-diethynylbenzene and p-dipropargyloxybenzene, the latter of which may be prepared by the reaction of hydroquinone with propargyl bromide under alkaline conditions as described, for example, in Whitlock et al., *J. Am. Chem. Soc.*, 105, 838–844 (1983). Typical hydrosilylation conditions, as described hereinabove, may be employed in the reaction of a hydride-terminated silicone with a bis (ethynyl) compound.

Molar ratios of olefinic hydroxy compound or diethynyl compound to hydride-terminated silicone are subject to considerable variation; optimum ratios may be determined by simple experimentation. Relevant factors include the reactivities of the reagents, the desire to produce compounds having terminal acetylenic linkages and the desire to avoid, as much as possible, the formation of oligomers (i.e., compounds in which "p" is greater than 1) having internal olefinic linkages, so as to obtain optimum usage of the acetylenic linkages present. For the most part, molar ratios of olefinic hydroxy compound or diethynyl compound to hydride-terminated silicone are in the range between about 1:1 and about 4:1 are conveniently employed.

The compositions comprising ethynylorgano silicones are useful as intermediates for preparation of the poly (conjugated diacetylenic) silicone compositions of the invention. The latter may be prepared, for example, by subjecting said bis(ethynylorgano)-terminated silicones to a Glaser coupling reaction, in which the bis(ethynylorgano)-terminated silicone is contacted with oxygen at a temperature in the range between about 10° C. and about 40° C. and in the presence of a catalyst system including a copper compound, an amine such as tetramethylethylenediamine and other catalyst/solvent constituents such as pyridine, dimethylformamide, 2-propanol, and mixtures thereof.

The poly(conjugated diacetylenic) silicone compositions of this invention may be cured, i.e., crosslinked, by the action of heat or of radiation, typically in the ultraviolet region. It has been discovered that ultraviolet curing may be easily achieved without the use of sensitizers or activators, simply by exposing the poly(conjugated diacetylenic) silicone composition to radiation in the ultraviolet region of the spectrum, although it is also within the scope of the invention to employ an art-recognized sensitizer. Said curing reaction is not fully understood with regard to mechanism or the molecular structure of the product, but it is believed to involve interaction between the acetylene moieties. The resulting cured compositions of the invention are useful as release coatings or conformal coatings.

The curing reaction may be conducted in the presence of aromatic ketones such as an acetophenone or a benzophenone. It has been reported that the presence of such compounds results in an increased curing rate. Reference is made, for example, to Hay et al., *Polymer Letters*, 8, 97–99 (1970).

Molecular structures were confirmed by $^1$H, $^{13}$C and $^{29}$Si NMR spectroscopy; polymer molecular weights by $^1$H NMR spectroscopy and/or by gel permeation chromatography, also known as size exclusion chromatography.

In order that those skilled in the art will be better able to practice the present invention, the following examples are given by way of illustration and not by way of limitation.

EXAMPLE 1

A hydride-terminated polydimethylsiloxane at 6.16 grams (19.3 millimoles based on Si—H) having a degree of polymerization of about 8, was placed under nitrogen in a 2-necked flask equipped with a condenser and a magnetic stirrer. It was diluted with 4.6 milliliters of toluene, and 2.69 g (26.3 mmol) of 2-(2-propenyloxy)ethanol was added. The solution was stirred and 46 microliters (µl) of Karstedt's catalyst (2.25% solution in toluene, 0.24 mmol Pt/mol Si—H) was added. After about a 2-minute induction period, an exothermic reaction took place and the solution turned yellow. An infrared spectrum recorded after 75 minutes revealed the absence of the Si—H band at 2126 cm$^{-1}$. The stirring was continued for the next 4 hours at room temperature. The reaction mixture was then diluted with 100 ml of ethyl ether and washed three times with water before drying over magnesium sulfate. The volatile materials were removed on a rotary evaporator. The residue was then dried under vacuum for 6 hours to give 8.0 g (98% of theoretical) of the desired bis[3-(2-hydroxyethoxypropyl)-terminated silicone.

To a 2-necked flask under nitrogen were added 8.26 g of the bis[3-(2-hydroxyethoxypropyl)-terminated silicone (13.5 mmol of hydroxy groups), 4.81 g (40 mmol) of propargyl bromide (80% solution in toluene) and 1.124 g (28.1 mmol) of sodium hydroxide. Tetrabutylammonium bromide, 219 milligram (0.68 mmol), was then added to the magnetically stirred mixture. The reaction was complete after 24 hours at room temperature as determined by proton nuclear magnetic resonance spectroscopy. A toluene solution containing the polymeric product was washed with water until neutral pH was achieved and dried over magnesium sulfate. The volatile materials were removed under vacuum and 7.2 g (82% of theoretical) of the desired bis {3-[2-(2-propynyloxyethoxy)]propyl}-terminated silicone was obtained. Its Mn was 900 and its Mw/Mn was 1.3.

A mixture of 34.3 mg (0.35 mmol) of cuprous chloride, 0.2 ml of pyridine, 0.2 ml of dimethylformamide (DMF), 3.0 ml of 2-propanol and 53 µl (0.35 mmol) of tetramethylethylenediamine (TMEDA) was stirred in a flask for 1 hour at room temperature. During stirring, the catalyst mixture was not protected from room light; however this did not have any effect on catalytic activity. After 1 hour, the catalyst mixture was added to 2.58 g (5.54 mmol of terminal acetylenic groups) of the bis {3-[2-(2-propynyloxyethoxy)]propyl }-terminated silicone. The reaction mixture was stirred while oxygen (19 ml/min) was bubbled through it for 16.5 hours. The reaction mixture was then diluted with 100 ml of methylene chloride and washed with water until no blue color was observed in the aqueous layer. The organic layer was dried overnight over magnesium sulfate, after which the volatile materials were removed on a rotary evaporator. The product was dried under vacuum for 8 hours. The desired poly(diacetylenic) silicone was isolated in 82% yield (2.12 g); its Mn was 3,600 and its Mw/Mn was 3.4.

The coupling reaction was also run in 50/50 pyridine/DMF as well as mixtures of 50/50 pyridine/DMF with toluene or isopropanol.

EXAMPLES 2–3

The procedure of Example 1 was repeated, respectively substituting 3-hydroxy-1-propene and 6-hydroxy-1-hexene on an equimolar basis for the 2-(2-propenyloxy)ethanol. Similar products were obtained.

EXAMPLE 4

The hydride-terminated polydimethylsiloxane of Example 1 (1.2 g, 3.76 mmol based on Si—H) and 1.0 ml (7.54 mmol) of 1,7-octadiyne were added together, under nitrogen, to a 2-necked flask equipped with a condenser and magnetic stirrer. To the stirred mixture was added 10 µL of Karstedt's catalyst (2.25% solution in xylene, 0.24 mmol Pt/mol Si—H). The mixture was heated to 50° C. and the reaction course was monitored by infrared spectroscopy. After 22 hours at 50° C., no Si—H remained. The reaction mixture was then dried under vacuum for 5 hours to remove excess 1,7-octadiyne. The desired bis(oct-1-en-7-ynyl)-terminated silicone was isolated in 60% yield (1.2 g). Its Mn was 1,400 and Mw/Mn was 1.5.

A catalyst solution prepared from 19.7 mg (0.20 mmol) of cuprous chloride, 30 µl (0.20 mmol) of TMEDA, 1.2 ml of pyridine and 1.2 ml of DMF was added to a reaction tube containing 1.79 g (3.2 mmol of terminal acetylenic groups) of the bis(oct-1-en-7-ynyl)-terminated silicone. Oxygen (19 ml/min) was bubbled through the stirred reaction mixture at 70° C. After 140 hours, the extent of chain end conversion had reached 65%. Stirring for an additional 70 hours did not result in further conversion. The reaction mixture was diluted with 100 ml of methylene chloride and washed with water until no blue color was observed in the aqueous layer. The organic solution was dried overnight over magnesium sulfate. The volatile materials were then removed on a rotary evaporator and the product was further dried under vacuum for 14 hours. The desired poly(diacetylenic) silicone was isolated in 69% yield (1.23 g). Mn and Mw/Mn were 3,400 and 2.3, respectively.

EXAMPLE 5

A solution of 5.204 g (28 mmol) of p-dipropargyloxybenzene in 46 ml of toluene was added to 8.924 g (28 mmol based on Si—H) of the hydride-terminated polydimethylsiloxane of Example 1 in a flask. The reaction mixture was stirred while 70 µl of Karstedt's catalyst (2.25% solution in xylene, 0.24 mmol Pt/mol Si—H) was added. The reaction mixture was stirred at 60° C. for 19 hours. After cooling to room temperature, the volatile materials were removed on a rotary evaporator. The product was further dried under vacuum for 20 hours. The desired bis{3-[p-(2-propynyloxyphenoxy)]propenyl}-terminated silicone, 13.92 g (99% yield), was isolated as a orange liquid.

A catalyst solution prepared from 22.5 mg (0.23 mmol) of cuprous chloride, 26 mg (0.23 mmol) of TMEDA, 1.2 ml pyridine and 1.2 ml of DMF was added to 1.84 g (3.6 mmol of terminal acetylenic groups) of the bis{3-[p-(2-propynyloxyphenoxy)]propenyl}-terminated silicone. The reaction mixture was stirred at room temperature while oxygen (19 ml/min) was bubbled through. After 20 min the mixture was diluted to 50 ml with methylene chloride and the solution was washed with water until the aqueous layer was colorless. The organic layer was dried over magnesium sulfate. After filtration, the solvent was removed on a rotary evaporator, and the product was dried under vacuum for 14 hours. The desired poly(diacetylenic) silicone (1.57 g, 86% of theoretical) was isolated as a brownish paste. Conversion of the chain ends was found to be 40%. Higher conversions could be achieved by allowing longer reaction times.

EXAMPLE 6

The hydride-terminated polydimethylsiloxane of Example 1 (0.998 g, 3.13 mmol based on Si—H) was mixed with 394.3 mg (3.13 mmol) of p-diethynylbenzene, 6 ml of toluene and Karstedt's catalyst (8 µl, 2.25% solution in xylene, 0.24 mmol Pt/mol Si—H). The reaction mixture was allowed to stir at room temperature for 29 hours, at which time it was determined that no Si—H remained. The solvent was removed on a rotary evaporator, and the sample was dried under vacuum for 12 hours to remove unreacted p-diethynylbenzene. The desired bis[2-(p-ethynylphenyl) ethenyl]-terminated silicone was isolated in 90% yield (1.25 g) as a yellow liquid. The Mn was determined by proton nuclear magnetic resonance spectroscopy to be 2,270.

The bis[2-(p-ethynylphenyl)ethenyl]-terminated silicone (192 mg, 0.20 mmol of terminal acetylenic groups) was placed in a reaction tube and a catalyst solution containing 1.2 mg (0.012 mmol) of cuprous chloride, 14 mg (0.012 mmol) of TMEDA, 0.13 ml of pyridine and 0.13 ml of DMF was added. Oxygen (16 ml/min) was bubbled through at room temperature for 21 hours. The reaction mixture was diluted to 30 ml with methylene chloride and worked up as described in Example 5. The desired poly(diacetylenic) silicone, 0.149 g (78% of theoretical) was isolated as a viscous yellow liquid. Its Mn was 7,000; conversion of chain ends was 70%.

EXAMPLE 7

The poly(diacetylenic) silicone of Example 1 was coated onto quartz plates (2.5 centimeter×7.5 centimeter) using an applying rod to achieve a film thickness of about 5 microns. The films were cured in a UV processor with a Primarc Minicure lamp (medium pressure mercury vapor lamp, 120 Watts/centimeter$^2$) and a line speed of 6 meters/minute. One irradiation was sufficient to make the film appear solid to the touch. The crosslinked films were transparent, smooth and slightly yellow. Ultraviolet spectroscopy was used to determine that maximum crosslinking was achieved after 3 irradiation runs. Similar observations were made for the product of Example 2.

A 30 mg sample of cured material were scraped off the glass plate and placed in toluene for 24 hours. Gel permeation chromatography was used to analyze the soluble non-crosslinked material left after curing. The Mn of the soluble part was found to be about 880 to 1,280 regardless of the number of passes on the processor. The amount of soluble material left after curing was estimated by washing the non-soluble part of each sample three times with 2 ml of toluene and then drying under vacuum for 4 hours. The amount of insoluble (crosslinked) material after curing accounted for up to 98% of the material scraped off the plate after two curing runs.

EXAMPLE 8

A 500 mg sample of the product of Example 1 was dissolved in 5 ml of methylene chloride and 12.8 mg of 2,4-dipropargyloxyacetophenone was added to produce a mixture in which 10% of the total acetylene functionality originated from the acetophenone. The mixture was stirred at room temperature for 30 min. The solvent was removed on a rotary evaporator, and the sample was dried for 14 hours under vacuum.

Films (5 microns) of the mixture were prepared and cured as described in Example 7. These films cured faster than those of Example 7, as determined qualitatively by UV/visible spectroscopy.

Similar curing results were obtained when the 2,4-dipropargyloxyacetophenone was incorporated into the structure of the silicone material, either by functionalizing the hydride-terminated silicone reactant of Example 1 with 2,4-dipropargyloxyacetophenone by hydrosilylation followed by Glaser coupling, or through the co-Glaser coupling of 2,4-dipropargyloxyacetophenone with the bis{3-[2-(2-propynyloxyethoxy)]propyl}-terminated silicone of Example 1.

Similar curing results would be expected if the dipropargyloxyacetophenone was replaced with acetophenone itself or other photosensitizers well known in the art such as benzophenones, thioxanthones and the like.

EXAMPLE 9

A toluene solution (30% by weight) of the poly (diacetylenic) silicone of Example 5 was cast onto a quartz plate with the use of an applying rod and a blade, to form a film estimated to be less than 10 microns thick. The film was irradiated as described in Example 7 in one pass and the resulting cured product was non-tacky.

EXAMPLE 10

A toluene solution (10% by weight) of the poly (diacetylenic) silicone of Example 6 was cast onto a quartz plate with the use of an applying rod and a blade, to form a film estimated to be less than 10 microns thick. The film was irradiated as described in Example 7 in one pass and the resulting cured product was non-tacky.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

What is claimed is:

1. An intermediate composition comprising ethynylorgano polyorganosiloxanes having the formula $$(M^1)_a(M^2)_b(D^1)_c(D^2)_d(T^1)_e(T^2)_fQ_g, \quad (I)$$

wherein:

$M^1$ is $(R^2)_3SiO_{1/2}$, $D^1$ is $(R^2)_2SiO_{2/2}$, $T^1$ is $R^2SiO_{3/2}$,

Q is $SiO_{4/2}$,

-continued $M^2$ is
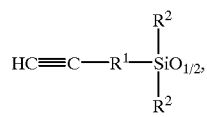

$D^2$ is
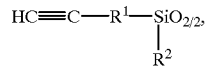

$T^2$ is
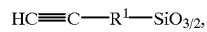

$M^2$ is
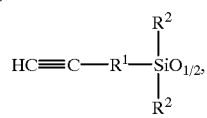

$D^2$ is
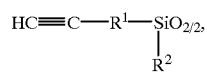

$T^2$ is
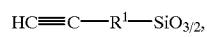

each of a, b, c, d, e, f and g is 0 or greater, with the proviso that b+d+f is at least 1;

each $R^1$ is independently a divalent organic radical having no Si—O—C moieties and containing at least one oxygen atom not directly bound to Si or at least one CH=CH moiety directly bound to Si; and each $R^2$ is independently non-halogenated or halogenated alkyl, aryl, alkoxy or aryloxy.

2. A composition according to claim 1 wherein e, f and g are each 0.

3. A composition according to claim 2 wherein b is 2 and d is 0.

4. A diethynyl-terminated polyorganosiloxane having the formula

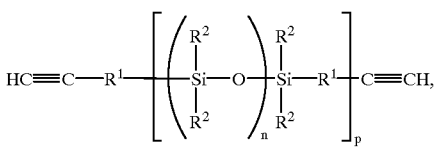

(II)

wherein:
each $R^1$ is independently a divalent organic radical having no Si—O—C moieties and containing at least one oxygen atom not directly bound to Si or at least one CH=CH moiety directly bound to Si;

each $R^2$ is independently non-halogenated or halogenated alkyl, aryl, alkoxy or aryloxy;

n is in a range between about 1 and about 500; and p is in a range between about 1 and about 100.

5. The polyorganosiloxane according to claim 4 wherein each $R^2$ is methyl.

6. The polyorganosiloxane according to claim 4 wherein $R^1$ has the formula

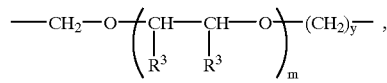

(III)

wherein each $R^3$ is hydrogen or $C_{1-4}$ alkyl, m is in a range between about 0 and about 100, y is in a range between about 1 and about 10, and $(CH_2)_y$ is bonded to silicon.

7. The polyorganosiloxane according to claim 6 wherein each $R^3$ is hydrogen.

8. The polyorganosiloxane according to claim 7 wherein m is 1 and y is 3.

9. The polyorganosiloxane according to claim 4 wherein each $R^1$ independently has the formula $$-R^4-CH=CH- \qquad (IV)$$

or $$-CH=CH-R^4-CH=CH-, \qquad (V)$$

with the olefinic groups bonded to silicon, wherein $R^4$ is a divalent organic radical.

10. The polyorganosiloxane according to claim 9 wherein $R^4$ is an alkylene radical containing carbon atoms in a range between about 2 and about 10.

11. The polyorganosiloxane according to claim 10 wherein $R^4$ is tetramethylene.

12. The polyorganosiloxane according to claim 9 wherein $R^4$ is p-phenylene or has the formula

13. A diethynyl-terminated polyorganosiloxane having the formula

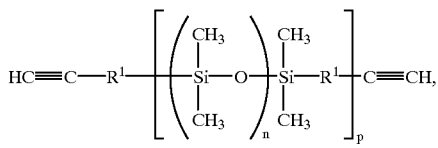

wherein $R^1$ has the formula $-CH_2O(CH_2)_2O(CH_2)_3-$ with $(CH_2)_3$ bound to silicon; n is in a range between about 5 and about 25; and p is 1 or 2.

14. A diethynyl-terminated polyorganosiloxane having the formula

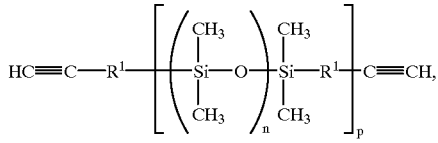

wherein each $R^1$ has the formula

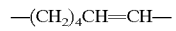

or

with the olefinic groups bonded to silicon; n is in a range between about 5 and about 25; and p is 1 or 2.

15. A composition comprising poly(conjugated diacetylenic)polyorganosiloxanes formed by coupling of an ethynylorgano polyorganosiloxane according to claim 1.

16. A composition comprising poly(conjugated diacetylenic)polyorganosiloxanes formed by coupling of an ethynylorgano polyorganosiloxane according to claim 4.

17. The composition according to claim 16 wherein each $R^2$ is methyl.

18. The composition according to claim 16 wherein $R^1$ has the formula

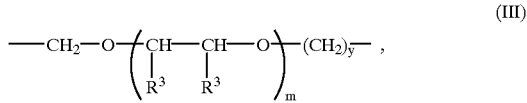   (III)

wherein each $R^3$ is hydrogen or $C_{1-4}$ alkyl, m is in a range between about 0 and about 100, y is in a range between about 3 and about 10, and $(CH_2)_y$ is bonded to silicon.

19. The composition according to claim 18 wherein each $R^3$ is hydrogen.

20. The composition according to claim 19 wherein m is 1 and y is 3.

21. The composition according to claim 16 wherein $R^1$ has the formula

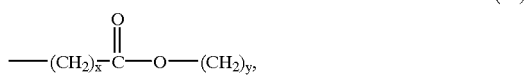   (IV)

wherein "y" is in a range between about 3 and about 10, $(CH_2)_y$ is bonded to silicon, and "x" is in a range between about 1 and about 100.

22. The composition according to claim 16 wherein each $R^1$ independently has the formula

   (IV)

or

   (V)

with the olefinic groups bonded to silicon, wherein $R^4$ is a divalent organic radical.

23. The composition according to claim 22 wherein $R^4$ is an alkylene radical containing carbon atom in a range between about 2 and about 10.

24. The composition according to claim 23 wherein $R^4$ is tetramethylene.

25. The composition according to claim 22 wherein $R^4$ is p-phenylene or has the formula

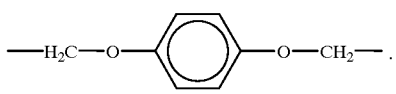

26. A method for producing a cured polyorganosiloxane which comprises exposing a poly(conjugated diacetylenic) polyorganosiloxane according to claim 15 to heat or radiation.

27. The method according to claim 26 wherein said poly(conjugated diacetylenic)polyorganosiloxane is exposed to ultraviolet radiation in the absence of sensitizers and activators.

28. A cured polyorganosiloxane prepared by the method of claim 26.

29. A cured polyorganosiloxane prepared by the method of claim 27.

* * * * *